United States Patent
Wang (10) Patent No.: US 7,241,986 B2
(45) Date of Patent: Jul. 10, 2007

(54) FIBER RINGDOWN PRESSURE/FORCE SENSORS

(75) Inventor: Chuji Wang, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 10/960,075

(22) Filed: Oct. 8, 2004

(65) Prior Publication Data

US 2005/0103988 A1      May 19, 2005

Related U.S. Application Data

(60) Provisional application No. 60/509,250, filed on Oct. 8, 2003.

(51) Int. Cl.
  G01J 1/04    (2006.01)
  G01J 1/42    (2006.01)
  G01J 5/08    (2006.01)

(52) U.S. Cl. ............. 250/227.14; 385/12; 385/13; 385/15

(58) Field of Classification Search ............... 250/227.14–227.18, 231.19; 385/12–14, 385/42, 15; 356/73.1, 32
See application file for complete search history.

(56) References Cited

U.S. PATENT DOCUMENTS

| 4,770,492 | A | * | 9/1988 | Levin et al. ............ 385/13 |
| 4,904,863 | A | | 2/1990 | McDearmon |
| 5,452,087 | A | * | 9/1995 | Taylor et al. .......... 356/480 |
| 5,745,611 | A | | 4/1998 | Komachiya et al. |
| 5,831,263 | A | * | 11/1998 | Komachiya et al. ... 250/227.17 |
| 6,563,970 | B1 | | 5/2003 | Bohnert et al. |
| 6,611,633 | B1 | | 8/2003 | Vohra et al. |
| 2002/0159671 | A1 | | 10/2002 | Boyd et al. |
| 2003/0007715 | A1 | * | 1/2003 | Loock et al. ........... 385/12 |
| 2003/0107739 | A1 | | 6/2003 | Lehmann et al. |
| 2003/0109055 | A1 | | 6/2003 | Lehmann et al. |
| 2003/0138185 | A1 | | 7/2003 | Dianov et al. |
| 2003/0210398 | A1 | | 11/2003 | Augustine et al. |
| 2004/0118997 | A1 | * | 6/2004 | Lehmann et al. ....... 250/227.14 |
| 2004/0137637 | A1 | | 7/2004 | Wang et al. |
| 2004/0160605 | A1 | | 8/2004 | Wang et al. |

OTHER PUBLICATIONS

Atherton, et al., "Gas detection by cavity ring-down absorption with a fibre optic amplifier loop", Proceedings of SPIE, vol. 4577, pp. 25-31 (2002).

Brown, et al., "Fiber-loop ring-down spectroscopy", Journal of Chemical Physics, vol. 117, No. 23, pp. 1044410447 (2002).

Duan et al., "Exploration of Microwave Plasma Source Cavity Ring-Down Spectroscopy for Elemental Measurements", Anal. Chem., vol. 75, pp. 2105-2111 (2003).

Greenwood, et al., "An optical pressure sensor for an aeronautical application using white light interferometry", Proceedings of SPIE, vol. 4075, pp. 94-100 (2000).

(Continued)

Primary Examiner—Thanh X. Luu
Assistant Examiner—Suezu Ellis
(74) Attorney, Agent, or Firm—DLA Piper US LLP (57) ABSTRACT

A novel fiber ringdown (FRP) pressure sensor is provided for measuring extremely high pressures under extreme environmental conditions of cold and heat. Pressure measurements are achieved in a time domain by measuring ringdown times of emitted light through the fiber optic loop of the device. The novel FRP sensor can include a light source, such as a diode laser light source, two 2×1 fiber couplers, a section of fused silica single mode fiber, a photodetector, and an electronic control. The novel FRP sensor's performance in the areas of stability, reproducibility, dynamic range, and temperature tolerance are far above those of conventional sensors.

28 Claims, 6 Drawing Sheets

OTHER PUBLICATIONS

Gupta, et al., "Cavity-Enhanced Spectroscopy in Optical Fibers", Optical Society of America, pp. 1-4 (2002).

Vohra, et al., "High Sensitivity Pressure Sensors Utilizing Advanced Polymer Coatings", Proceedings of SPIE, vol. 13, No. 3746, pp. 557-560 (1999).

Wang, et al., "Capsule pressure sensor with optical fiber coupling", Proceedings of SPIE, vol. 2895, pp. 492-496 (1996).

Wang et al., "Cavity Ringdown Spectroscopy for Diagnostic and Analytical Measurements in an Inductively Coupled Plasma", Applied Spectroscopy, vol. 56, No. 3, pp. 386-397 (2002).

Zheng, et al., "X-shape optical fiber pressure sensor: constituted by a single mode optical fiber directional coupler with a reflecting end face", Proceedings of SPIE, vol. 2895, pp. 421-425, 1996.

\* cited by examiner

FIBER RINGDOWN PRESSURE/FORCE SENSORS

This application claims priority from U.S. Provisional Application Ser. No. 60/509,250 filed Oct. 8, 2003. The entirety of that provisional application is incorporated herein by reference.

BACKGROUND OF THE INVENTION

1. Field of the Invention

This invention relates to the field of fiber pressure/force sensors, in particular, to the manufacture of optical fiber pressure sensors using a fiber ringdown apparatus and to a method of determining pressure using such sensors.

2. Background of the Technology

During the past 30 years, fiber optical sensor technology has progressed rapidly, outperforming conventional sensors with sensors having high sensitivity, fast response, low cost, lightweight, and immunity to electromagnetic interference. These improved sensors have been used in a wide range of industries, including aerospace, military, petrochemical, transportation, building and structural monitoring, chemical, and biomedical sectors.

Within the last decade, cavity ringdown spectroscopic (CRDS) techniques have gained rapid development. Ringdown-based instruments are on the market and being used for trace moisture analysis in semiconductor manufacturing industries. Applications of cavity ringdown (CRD) techniques are also expanding into uses in many other areas, such as environmental monitoring and medical diagnostics. The evolution of CRD techniques has led to diversified techniques, which can be classified by configurations of ringdown cavities, such as, for example, the initial mirror-base CRDS, internal reflection-based prism CRDS and fiber end-coated CRDS, and the more recent fiber Bragg grating CRDS.

Within the last two years, a new fiber ringdown technique has emerged. Functionally, this type of fiber ringdown technique resembles the standard high reflectivity CRDS with the exception that it does not require high reflectivity parts such as ring down mirrors. The new fiber ringdown technique utilizes an optical resonator (an optical fiber loop) as the ringdown cavity. In operation, initially light radiation is coupled into the fiber loop. When the light source is rapidly shutoff, the resultant light "rings" inside the fiber loop for many round trips. In each round trip, a small fraction of light leaks into a photodetector through a fiber coupler while the rest of the light continues to ring in the optical fiber loop and experiences internal fiber transmission losses. The signal intensity observed by the detector follows an exponential decay. The lower the losses of the light in the fiber, the longer is the decay time constant (ringdown time).

In 2001, a complicated fiber loop configuration was developed for a direct gas phase absorption measurement. See Stewart, et at., "An investigation of an optical fibre amplifier loop for intra-cavity and ring-down cavity loss measurements", Measurement Science and Technology, 12:843–849 (2001), the complete disclosure of which is fully incorporated herein by reference. In 2002, Brown et al. reported progress on a fiber loop ringdown technique developed for liquid phase detections using a simplified approach. See Brown, et al., "Fiber-loop ring-down spectroscopy", Journal of Chemical Physics, 117:10444 (2002), the complete disclosure of which is fully incorporated herein by reference.

U.S. Patent Application Publication No. 2003/0107739, published Jun. 12, 2003 discloses a fiber loop ringdown apparatus for the detection of liquid samples and water vapor, the complete disclosure of which is fully incorporated herein by reference. Thus far all ringdown techniques have been limited to trace gases/liquids spectral measurements. There has been no report or suggestion for the use of the ringdown concept for fiber pressure sensor development.

In recent years, the development of fiber pressure sensors has been primarily based on the foundation of an interference concept, such as, for example, the well known fiber Fabry-Perot interference (FFPI). See, for example, U.S. Patent Publication No. 2003/0138185, published Jul. 24, 2003, the complete disclosure of which is fully incorporated herein by reference. There are many methods that can be used to design and fabricate a FFPI cavity, but the basic principle remains the same. The external changes of pressure or temperature induce the variations of fiber refractive index, or fiber length, or both, resulting in a phase shift of the two coherent light beams changes. The pressure is measured by processing the interference patterns. Similar means are used for temperature measurements. This technique is of high sensitivity, high accuracy, and rapid response. FFPI sensors can be widely used for pressure sensing in a variety of environments. At present, the commercial products of this type of sensor can measure pressure up to 100 psi (69 bars) with a temperature tolerance limit up to 250° C. To date, the reported laboratory measuring limit is 6000 psi and the highest surviving temperature is 800° C. This therefore can be generally considered as very rugged among conventional pressure sensors. However, the FFPI sensors still cannot meet the special needs in aerospace technologies such as propulsion testing, where the upper pressure limit can reach to 15,000 psi. At the same time, the extreme temperatures can be as low as 19 K (34 R).

Another type of newly emerged fiber pressure sensor is based on fiber Bragg gratings (FBGs). In these sensors, a grating, or multiple gratings are written on a small section of fiber. When the wavelength of the light source injected into the fiber satisfies the Bragg condition, the light of this wavelength is strongly reflected while light of other wavelengths is transmitted. If the fiber is exposed to a pressure, which induces the variation of physical parameters of the gratings, the Bragg wavelength of the reflected light changes. Bragg sensor products are still in the early stages of development and use. The most obvious advantage of FBGs sensors is the high sensitivity. Such sensors can sense any change induced by pressure, strain, temperature, acceleration, and vibration. Ironically, this sensitivity in some applications becomes a disadvantage, because it is so sensitive that special care of the operating environments is needed to maintain a steady signal background. Furthermore, sensor instrumentation becomes very complicated and expensive since it must be capable of distinguishing the external change from among pressure, temperature, or other factors.

None of the conventional sensors are capable of providing the advantages of measuring extremely high pressure with tolerance of temperature extremes.

SUMMARY OF THE INVENTION

The fiber ringdown pressure sensor of the present invention provides a pressure sensor, which retains the advantages of the latest FFPI sensors and the advantages of FBG sensors, such as high sensitivity, lightweight, compact size, low cost, and freedom from electromagnetic interference and also provides its own unique advantages. Some of the unique merits of the novel FRP sensors of the present invention, compared with the functions of FFPI and FBG sensors, are the capability of the device for measuring extremely high pressure, up to tens of thousands psi, and the extreme temperature (low/high) tolerance (77 K-1900 K) of the device.

Figure 1:
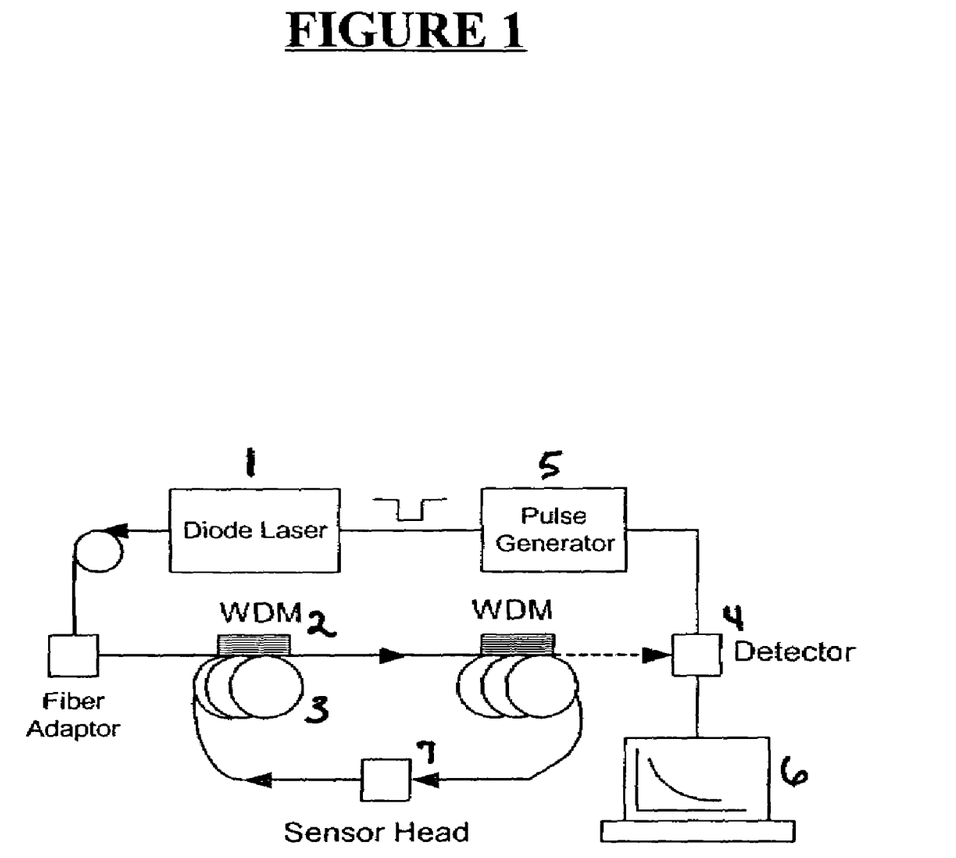
FIG. 1 is a diagram of one possible embodiment of the fiber ringdown pressure sensor.

As best illustrated in FIG. 1, the basic configuration of the novel fiber ringdown pressure sensor of the present invention includes a laser light source (1), fiber couplers (2) (i.e., wavelength division multiplexers or WDM), sections of optical fibers (3), an electric control (5), a photodetector (4), a data acquisition system (6), and a sensor head (7). A laser light source for the present invention can be of any type of laser light system. Preferred laser light sources are diode laser light sources. Of the diode laser light sources, preferred light sources can be, for example, a temperature controlled diode laser light source, an external cavity diode laser light source, or a combination of several laser diodes together to serve as a broad band tuneable laser source. The electric control for the laser light system can be a pulsed or a continuous wave generator. The fiber couplers do not necessarily have to be identical and the number of couplers can vary as necessary. The tap ratio for the legs of the couplers can vary as well, for example, from 50:50 to 1:99. Similarly, the sections of optical fibers can be single or multi mode, and the lengths can vary tremendously, for example, lengths can range from a very few meters to several hundreds of meters. The specifics of these basic components of the present invention depend on the desired range and sensitivity of the pressure sensor.

A general configuration of the sensor of the present invention would have one leg of one coupler connected to the light source. One leg of another coupler can be connected to the photodetector element of the invention. The remaining legs of the couplers can be spliced together with the optical fiber sections to form a loop. The sensor head component of the invention can simply be a section of the loop that serves as a location where forces can be applied. It is within the concept of the invention that the sensitivity of the sensor head can be increased by removing the fiber jacket. It is also within the concept of the present invention that the device can alternatively include an optical component, such as, for example, a fiber Bragg grating, which can also increase the sensitivity of the novel device.

In operation, the provided light passes through the coupler, the leg of which is connected to the light source. The light then rings around the loop formed by the system of optical fibers and coupler legs. During each round trip in the loop, a portion of the light escapes into the photodetector through the coupler leg connected to the photodetector. The photodetector serves to monitor the intensity decay behavior of the light that comes into it. The data acquisition system then collects and analyses the acquired data from the photodetector.

Thus the present invention provides a novel device for sensing pressure, the device including an electronic control operationally attached to a laser light source, which is connected by a coupler to an optical fiber configured in a continuous loop, the loop having couplers for providing light escaped from the loop to photodetectors, which pass the collected escaped light data a data acquisition system.

In determining the present invention, the ringdown time (τ) is related to the Force applied by the following equation:

$$\tau = \tau_0 \left(1 - \frac{\beta l}{\alpha L + E} F\right)$$

where $\tau_0$ is the ringdown time when no force is applied, F is the force applied, α is the wavelength dependent absorption coefficient for fiber core material with units of, e.g., cm$^{-1}$, β is the force induced loss coefficient with units of, e.g., g$^{-1}$, cm$^{-1}$, l is the length of the fiber which has direct contact with the force being applied, L is the total length of fiber, and E is total insertion losses of the fiber couplers.

DETAILED DESCRIPTION OF THE INVENTION

The following description of the invention as discussed in light of the referenced Figures is exemplary of the broad concept of the invention, which is limited only by the claims attached hereto.

As best shown in FIG. 1, a schematic diagram of the general concept of the pressure sensor is provided. The laser light source in this non-limiting example of the present invention is a temperature controlled diode laser source (i.e., NEL American, NLK1US5E1AA) (1) and the electric control (5) is a pulse generator. The two sections of optical fibers (3) are fused silica single mode fibers (i.e., Corning SMF 28). The fiber couplers (2) in this example of the present invention are identical 2×1 fiber couplers (i.e., Lightcomm Technology Co. Ltd.). The quoted tap ratio in the 2-leg end of the fiber couplers is 1:99. The two 1-leg ends and the two 99% legs are spliced together (i.e., Ericsson 925) with the two sections of single mode fibers to form a fiber loop. The light formt hesingle mode fiber of the pig-tailed laser diode is coupled into the fiber loop through the 1% leg in the 2-leg end with FC/APC fiber connectors. The 1% leg of the other coupler is coupled to the photodetector (4). The total length of the loop is 61 meters. The quoted insertion loss of each coupler is less than 0.2 dB. The absorption loss rate of the fiber is 0.3 dB/km at 1550 nm. Also shown in this non-limiting example of the present invention is a data acquisition system (6) that processes and analyses test data and outputs the results. The 1% leg of the other coupler is coupled to the photodetector (4). The total length of the loop is 61 meters. The quoted insertion loss of each coupler is less than 0.2 dB. The absorption loss rate of the fiber is 0.3 dB/km at 1550 nm. Also shown in this non-limiting example of the present invention is a data acquisition system (6) that processes and analyses test data and outputs the results.

Figure 2A:
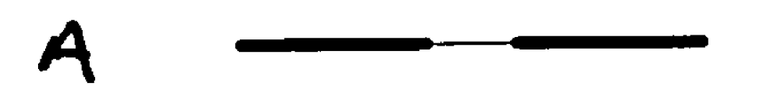
FIGS. 2A and 2B is a diagram of the section of fiber used in the sensor head.
Figure 2B:
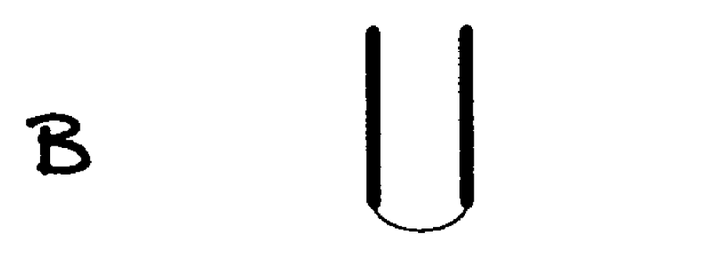

The sensor head (7) of the exemplary device serves as the location where force is applied. It is within the concept of the invention that the sensitivity of the sensor head can be increase by removing its fiber jacket. Also shown in this exemplary embodiment is a separate piece of fiber, independent of the fiber loop, which lies parallel to the section of the fiber loop. FIGS. 2A and B shows a diagram of a fiber prepared for use as a sensor head. An aluminum plate of a rectangular shape sits on the top of these two sections of fibers, forming a loading platform.

In operation of an exemplary embodiment of the present invention, a laser beam provided by a compact semiconductor laser diode is coupled into a fiber loop consisting of a section of single mode optical fiber. When the light source is rapidly shutoff, the resultant light rings inside the fiber for many round trips. In each round trip, a small fraction of light leaks into a photodetector through a fiber coupler, the rest of the light rings in the fiber and experiences the internal fiber transmission losses including absorption, scattering losses, and fiber coupler insertion losses. The signal intensity observed by the detector follows an exponential decay. The lower the loss of light in the fiber, the longer the decay time constant (ringdown time). The ringdown time decreases when an external pressure is applied to a small section of fiber (the sensor head), due to the radiative loss resulting from the microbending induced by the pressure. In the present invention the pressure can easily be determined from the ringdown time measurements. The obvious advantages of this innovative technology are: (1) The pressure measurement will be independent of fluctuation of light intensity; (2) the sensor will have very high sensitivity and accuracy; (3) the sensor will have a large measurement range and high tolerance to extreme temperatures; (4) the sensor will be immune to electromagnetic interference and not pose electrical spark hazards; (5) the sensor will be very durable, robust, and inexpensive.

The present invention, in providing a novel device for measuring pressures, even extreme pressures under widely varied extremes of temperatures, generally follows the exemplary method of determining pressure discussed below.

Method of Determining the Pressure

The ringdown is modeled by assuming exponential decay of the light pulse by $$\frac{dI}{dt} = \frac{IAc}{nL}, \quad (1)$$

where I is the light intensity at time t, L is the total fiber length, c is the speed of light in the vacuum, n is the refractive index of the fiber, and A is the total loss in each round trip, including absorption loss and the fiber couplers' insertion losses (the low scattering loss is negligible). $A=\alpha L+E$, where $\alpha$ is the wavelength dependent absorption coefficient for fiber core material with units of, e.g., $cm^{-1}$, and E is total insertion losses of the fiber couplers. The solution of Equation (1) describes the temporal behavior of the light intensity observed from the detection:

$$I = I_0 e^{-\frac{c}{nL}At}, \quad (2)$$

The time required for the light intensity, I, to decrease to 1/e of the light intensity, $I_0$, is referred to as ringdown time, $\tau_0$, and is given by:

$$\tau_0 = \frac{nL}{cA}, \quad (3)$$

When an external force, F (grams) (converted to the pressure by equation P=F/S, S is the interaction area), is applied to a section of the fiber, it induces a loss of light. The introduction of this force-induced, B, causes a change in the ringdown time, $\tau$:

$$\tau = \frac{nL}{c(A+B)}, \quad (4)$$

where $B=\beta lF$. $\beta$ is the force induced loss coefficient with units of, e.g., $g^{-1}$, $cm^{-1}$ and l is the length of the fiber which has direct contact with the force being applied. When B<<A, Equation (4) can be rearranged to under the first order approximation:

$$\tau = \frac{nL}{c(A+B)} \approx \frac{nL}{cA}\left(1 - \frac{B}{A}\right) = \tau_0\left(1 - \frac{\beta l}{\alpha L + E}F\right), \quad (5)$$

Figure 3:
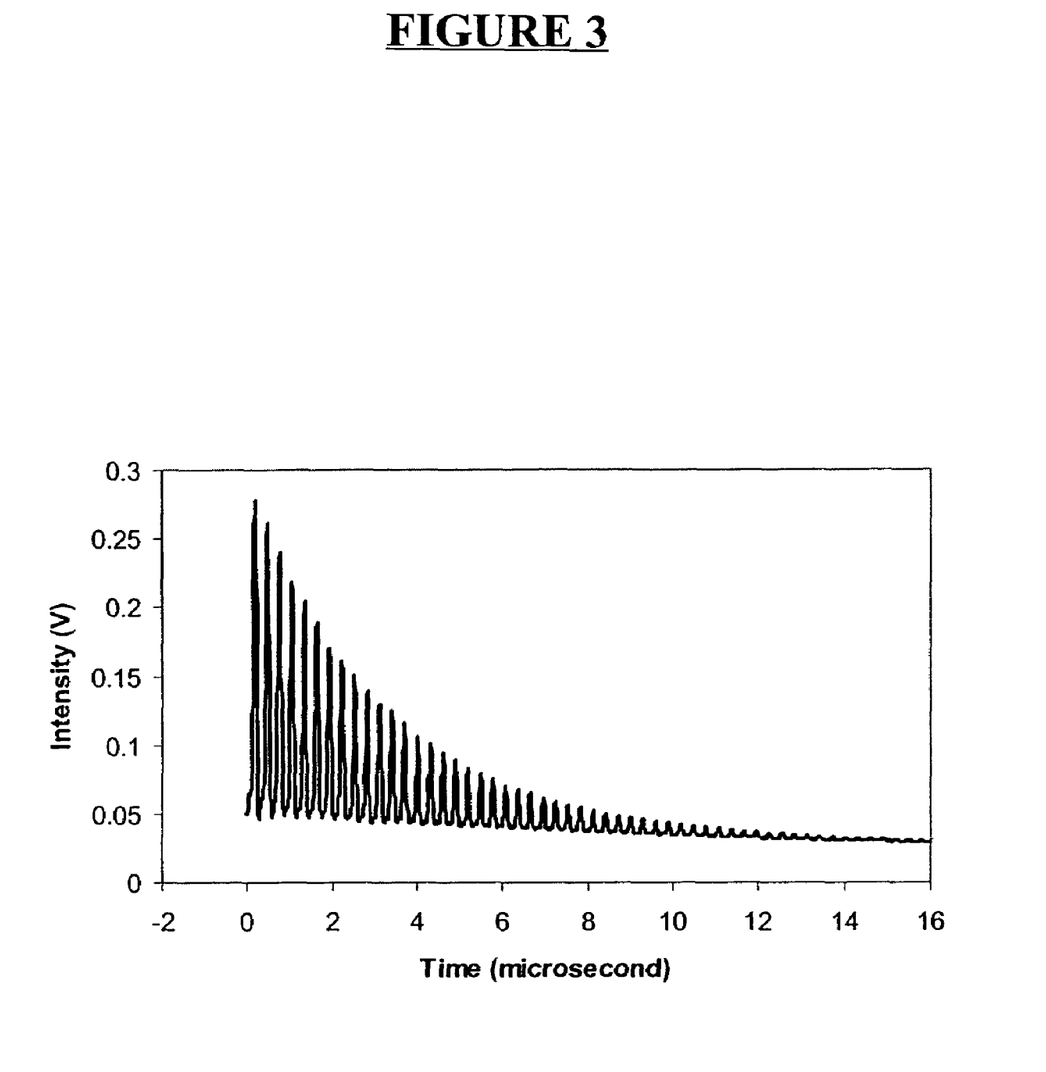
FIG. 3 is a typical fiber loop ringdown waveform. The round trip time is 298 ns. The ringdown time is 3.95 μs. The fiber loop length is quoted as 61 m. The refraction index of the single mode fuse silica fiber is measured to be 1.464, which is the same the material value: 1.464. The detector was used at minimum gain setting with 10 MHz band width.

Equation (5) indicates that, for a given fiber ringdown force sensor device, the measured ringdown time is a linear function of the applied force. In Equation (5), when F is 0, the intercept of the curve corresponds to the ringdown time, $\tau_O$, which characterizes the physical parameters of the fiber sensor device, such as fiber absorption loss, couplers' insertion losses, refraction index, and fiber length. Given the fiber length, the refractive index can be derived from the measured ringdown time; or, given the fiber length and refraction index, the total fiber losses can be derived. FIG. 3 shows a typical fiber ringdown waveform. Since the detector response time is shorter than the light round trip time (298 ns), each round trip pulse is separately detected by the detector. The ringdown waveform follows a single exponential decay curve, with a ringdown time, in this case, of 3.95 μs. Using the observed ringdown time and the known fiber length, the refractive index can be determined, (1.464 for the given example). The total transmission loss for this example is derived to be 0.34 dB, which is slightly lower the quoted number, 0.4 dB.

The following non-limiting example of the an electrical control for activation and deactivation of the laser light source of the present invention demonstrates the method of operation of the pressure/force sensing device. In the operation of the present invention, it is understood, that the frequency of activation and deactivation of the laser light source can be greatly varied without departing from the concept of the present invention. For example, the frequency used can be in the range of 1 Hz to 1 MHz. An exemplary frequency for the control can be about 10 Hz. No acousto-optic modulation (AOM) was utilized to control the ringdown event in the fiber loop ringdown device. When the CW laser beam from the diode laser was coupled into the fiber loop, the detector observed a signal. This signal was then applied to a pulse generator (SRS DG 535) to trigger the generator to generate a series of negative square waves (2.5 V and 10 Hz). This pulsed series was than applied to the diode laser driver to rapidly drop the laser current to zero. In this way a series of laser pulses was generated. For each laser pulse, the detector observed a series of pulsed spikes resulting from each round trip of the laser pulse in the fiber loop. The intensity decay curve was monitored by an oscilloscope (Tektronix 460 A), which was interfaced to a computer for further data processing. In the experiments, the triggering threshold was set at 0.45 MV when the gain of the detector was set to the minimum level. For this experimental system, the ringdown time is on the order of µ's and the time interval of the current modulation is 100 ms; therefore, a complete ringdown event can be observed for each laser pulse. The bandwidth of the oscilloscope used is 400 MHz, and the peak response of the detector is 10 MHz. These features allowed the pulsed spikes that were transmitted to the detector in each complete round trip in the filter loop to be distinctively resolved on the ringdown waveform.

Figure 4:
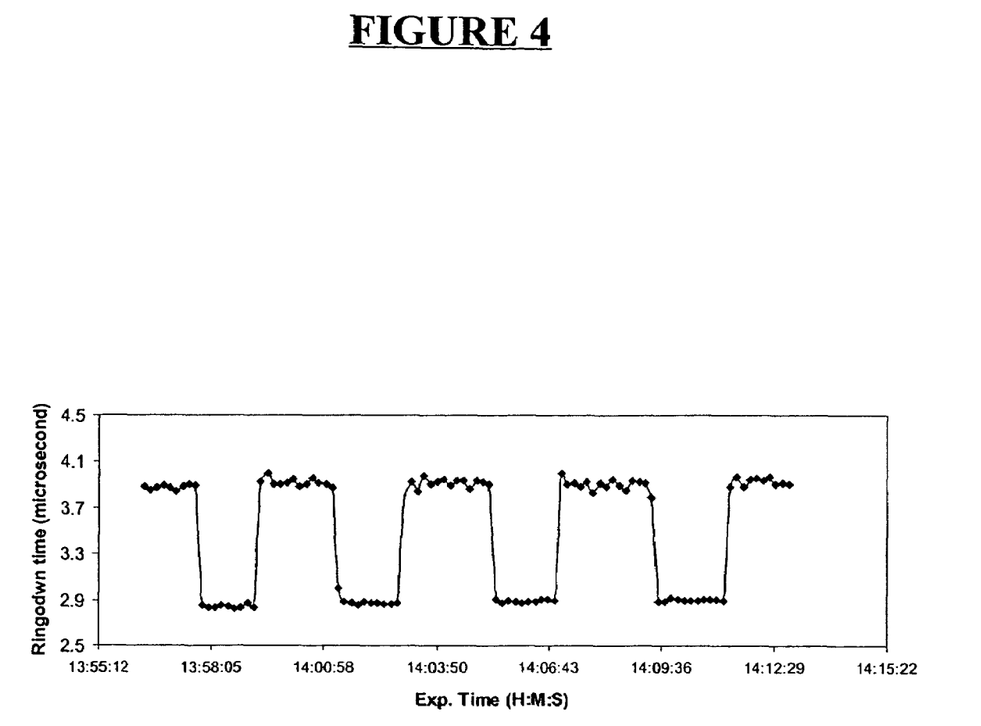
FIG. 4 is fiber ringdown pressure/force sensor responses well with and without force applied to the sensor head. The applied force is 474 grams, approximately corresponds to 675 psi.
Figure 6:
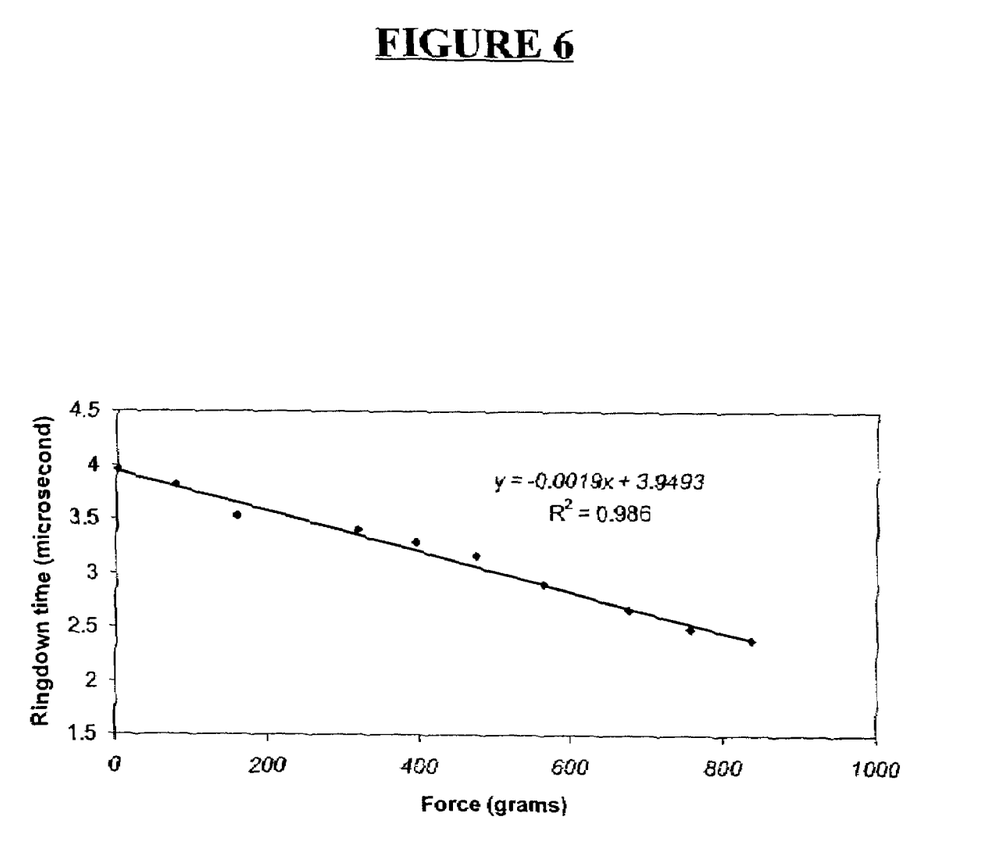
FIG. 6 is the calibration curve of ringdown time vs. the applied force in FIG. 3.

FIG. 4 shows the ringdown response to a 474 grams force loaded and unloaded on a section of fiber. The 474 grams force is comprised of six identical aluminum plates, circular in shape and each having a mass of 79 grams. The section of fiber where the forces are loaded and unloaded lies on the clean surface of the stainless optical table with the fiber jacket removed from this area (sensor head). The contact area is the fiber cladding layer, and the interaction length is 8 mm. The fiber diameter of the cladding layer is 125 µm. This 474 grams force corresponds to ~675 psi pressure. Each of the data points in FIG. 6 comes from an average of 100 ringdown events. The curve shows that the fiber ringdown pressure sensor not only has a rapid response to pressure but also very good repeatability.

Figure 5:
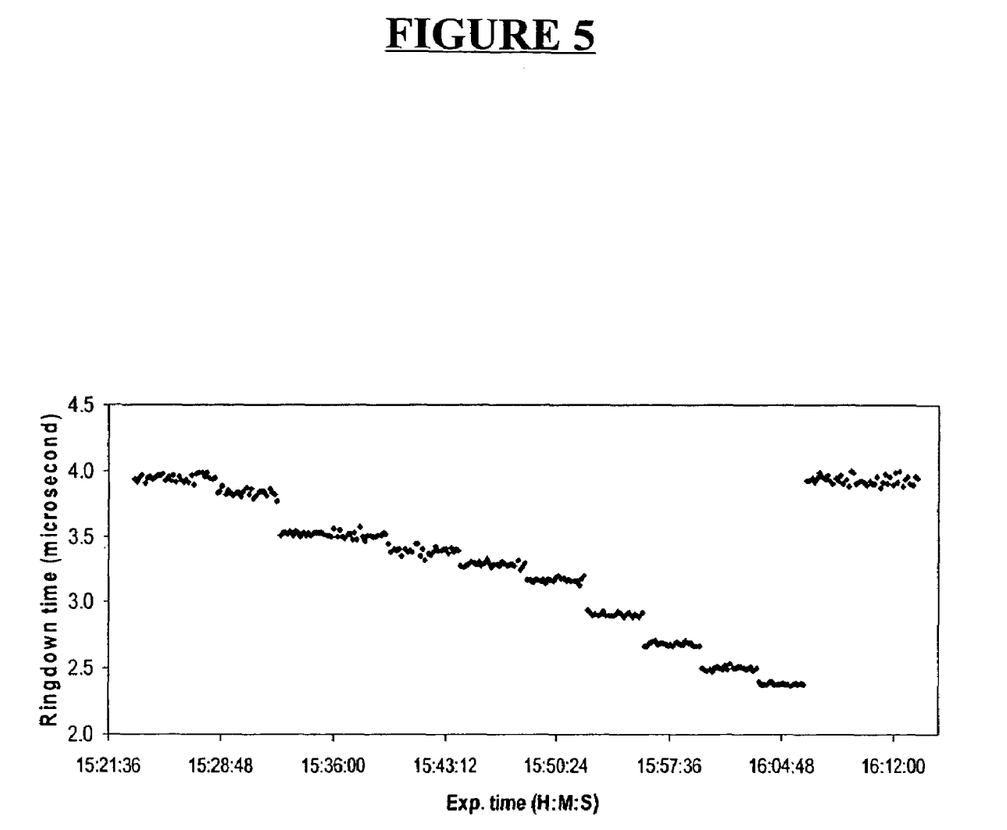
FIG. 5 is a typical ringdown time responses to applied forces. The applied forces from the beginning to the end with distinctive steps are 0, 79, 158, 316, 395, 474, 562, 677, 756, 835, and 0 grams.

FIG. 5 shows a typical testing curve obtained for measured ringdown times vs. applied forces. The applied forces are in the range of 0-835 grams, approximately, corresponding to pressures in the range of 0-1190 psi based on equation, P=F/S. The measured ringdown times decrease from 3.94 µs at 0 psi to 2.38 µs at 1190 psi. The linear curve of the measured ringdown time vs. force is shown in FIG. 4. The observed linearity is readily predicted by Equation (5). The intercept on the y-axis corresponds to the $\tau_0$, when the applied force is zero. The slope of this figure (k) is a function of multiple variables. It is related to n, L, α, E, β, and l. All these variable are the physical parameters of the FRP sensor itself. For a given FRP sensor, these variable are constants. The first order approximation made in equation (5) can now be evaluated using the measured interception and the slope in FIG. 5. From equation (5), $$k = -\tau_0 \frac{\beta l}{A}, \text{ thus } \frac{B}{A} = \frac{kF}{\tau_0},$$

When E=0, there is no fiber coupler insertion loss. Thus, the slope in Equation (5) is simplified to:

$$k' = -\tau_0 \left(\frac{\beta}{\alpha}\right)\left(\frac{l}{L}\right), \quad (6)$$

This clearly indicates that for a given fiber device, the longer the fiber section that is used as the sensor "head", the more sensitive the sensor. In a sample test, the absolute value of the slope increases from 0.0019 to 0.0036 when the fiber length in the sensor head increases from 8 mm to 16 mm. Similarly, the slope decreases from 0.0019 to 0.0016 when the length decreases from 8 mm to 6 mm. The variation of the slope is approximately proportional to the variation of the fiber length used in the sensor head. As a result, the sensors can be designed and fabricated with selected areas to yield design-specified detection sensitivity.

Detection sensitivity of the pressure sensor decreases when the force is applied to the fiber with the plastic fiber jacket in contact. However, the fiber jacket serves as a buffer and greatly increases the up limit of the measuring range. In an experiment with a fiber-pressure interaction length of 8 mm, the measurable force was up to 1500 grams, or, 2136 psi. FRP sensors with specifically designed sensor head, using a protection layer or buffer layer outside the fiber, are suitable for pressure sensing in high measuring ranges. The maximum measuring limit is, to a large extent, reliant upon the design of the sensor head.

The FRP of the present invention also has a high temperature tolerance. When the sensor head is heated up to 870 K by a heat gun (i.e., Wagner Power Stripper with a maximum thermal equilibrium temperature 870 K), no change in the measured ringdown time is observed. Similarly, when the sensor head is submerged into a liquid nitrogen bath, where T=77 K, the ringdown time has no change. This insensitivity to temperature is partially due to the very low thermal expansion coefficient, $4 \times 10^{-6}$ $C^{-1}$, of the fused silica single mode fiber as well as the way in which the single mode laser beam is launched into the loop by angle polished fiber connectors. FRP sensors made of this fiber material are suitable for pressure measurements in many extreme temperature environments. If different fiber materials or multiple mode fibers with comparatively larger temperature coefficients are used to develop this type FRP sensor, simultaneous measurements of pressure and temperature in a single device are conceivable. Furthermore, if multiple sensor heads are assembled in a single sensor device, multiple functional fiber ringdown sensors can be made to sense pressure, temperature, and species in a single device.

This ability to configure a single device of the present invention to sense one parameter, i.e., pressure, or multiple parameters, i.e., pressure, temperature, and species can also be accomplished by configuring the device to include multiple fiber loops for measuring multiple parameters in the same device.

Due to the low cost, compact size, lightweight, flexible geometry, extreme temperature tolerance, and immunity to electromagnetic interference, fiber ringdown sensors of the present invention can be used in a wide variety of applications such as aerospace technology development, oil/natural gas recovery, long-term monitoring of bridge/railroad load bearing, and medical instruments.

The Fiber Ringdown Pressure Sensor is a novel concept, which employs the fiber ringdown technique to build on the latest optical fiber and diode laser technologies to provide a device capable of rapid pressure sensing in the harshest temperature environments.

One way is which the fiber ringdown pressure sensors (FRP sensor) of the present invention differs significantly from the current (Fabry-Perot or Bragg grating) fiber pressure sensors, is that the pressure measurement in the present invention is achieved in the time domain, by measuring the residence time of light ringing in a fiber loop.

Significant to this innovation is that the FRP sensors of the present invention can sense pressure in the range of 0-150,000 psi, depending on the specific design and fabrication of the sensor head. (1 bar=14.5 psi) while operating in extreme temperature environments, e.g., from 77-1900 K.

Also the FRP sensors of the present invention can reduce deployment costs due to their light weight, compact size, and flexible geometry (just a section of optical fiber).

Furthermore, the FRP sensors will be inexpensive, robust, and durable as there is no coating, no film, and no semiconductor devices in the sensor head.

Additionally, the FRP sensors will be immune to electromagnetic interference, will not emit electrical interference and will not pose a spark hazard to the test environment.

No conventionally available pressure sensor offers such unique capabilities in a single device. Conventional pressure sensors can only survive at temperatures in the range of approximately 600 K and have limited range (0-1000 psi). While pressure sensors, which are based on Fiber Bragg grating (FBG), are available for high pressure sensing, they are very expensive and complicated instrument configurations and are extremely sensitive to measuring environments. Such limitations of conventional fiber pressure sensors are an obvious hindrance to their applications to NASA propulsion testing. In contrast, FRP sensors of the present invention, which are built on an entirely different concept, do not require the use of using coatings, cavities, and/or a diaphragm, and can be capable of measuring pressures up to 150,000 psi in extreme temperature environments with response times of milliseconds. Further, the configuration with the sensors of the present invention enable them to be integrated into a remote computer network for data processing and transmission.

The above recited advantages make the FRP sensor of the present invention extremely well-suited for very high pressure sensing in extreme environments. For example, the sensor of the present invention can be used for National Aeronautics and Space Administration (NASA) testing represents that heretofore have been inadequately addressed.

For example, FRP sensors of the present invention can be used for rapid response (less than 1 ms), high pressure (over 15,000 psi and as high as 150,000 psi) measurement sensors for rocket propulsion testing. These novel sensors can also be used in cryogenic applications as well as high temperature areas not exceeding 1900 K. The simplicity of design of these novel FRP sensors also makes them extremely rugged and reliable pressure sensors for use in monitoring rocket engine fuel tanks.

Further, these novel sensors can be adapted for use in temperature, flow rate, rocket plume constituents, and effluent gases sensors in rocket propulsion testing.

Sensors of the present invention can also be used to measure embedded structural fatigue, stress, life cycle load monitors on the Space Shuttle or other space craft. Further application related to the needs of NASA, for which these novel sensors can be use include vehicle environmental monitoring (airspeed, air temperature, ambient and stagnation pressures, air density, flow angle, and humidity at low air temperatures) and advanced instrumentation for aeropropulsion flight tests.

The novel sensors of the present invention can also be provided with a vacuum system for forming a low atmospheric pressure environment around the sensor head of the device. By providing a very low pressure environment for the sensor head, the device can be capable of sensing negative pressure. In aerospace uses and many test environments this adaptability of the present invention can be of great advantage. Such vacuum system equipped devices can be used as a vacuum meter.

It is also within the concept of the present invention that these novel FRP sensors can be employed to meet a wide variety of other non-aeronautical, conventional needs.

For example, they can be used for down-hole pressure/temperature monitoring in oil/nature gas recovery industries. Down-hole sensors experience extremely harsh environments that these sensors can withstand and maintain accuracy.

They can also be used for load history monitoring and detection of structure weakness in roads, bridges, dams, or railroads. The nature of these novel FRP devices would allow them to be easily embedded in the structures which are to be measured.

Many ships are now using composite structures to make them lighter. Such composite materials currently require long term monitoring for structural integrity. The FRP sensors of the present invention can be are ideal for embedding in the composites during manufacture and thus could provide long term structural measurements.

Another likely application of the FRP sensors of the present invention is pressure measurement in large in-cylinder engine testing. The temperature insensitivities of these novel pressure sensors would make them ideal for this type of instrumentation and measurement.

As is evident from the few examples applications recited above, there are many industry processes which require pressure sensing in high temperature environments. The inert nature (glass) of this novel sensor makes it ideal for such processes and provides the added benefit of not being a spark hazard. Additionally, having no electromagnetic interference makes this novel sensor ideal for plant operations where large motors and switch gear are common.

In developing specific embodiments of the present invention that can be designed to meet a particular need, the basic components of the device, such as each device will a fiber coupler(s) and a section of fiber, can be fabricated to peruse the minimum fiber absorption loss and insertion loss. These sensors can be designed to have different configurations in terms of fiber materials, coupling methods, fiber lengths, and the coupler's tap ratios while remaining within the concept of the current invention. An exemplary sensor head is a section of fiber that is set between two metal plates, and can be self-designed to hold the section of fiber and allow more plates to be added so as to change the pressure on the section of fiber. Such flexibility in designing a sensor of the present invention permits exploration of the influence of each factor on sensor performance so as to permit one to design a specific sensor suit to the particular need at hand.

The design of the sensor of the present invention as adopted to meet particular needs can focus on characteristics such as, for example, sensitivity, stability, response time, reproducibility, and durability.

For a particularly designed sensor according to the present invention, the sensitivity can be effected by using different fiber lengths and structures (with/without a fiberjacket) of the section of fiber used in the sensor head and the roughness of the interaction surfaces of the metal plates in the sensor head. Such sensors which are adapted for particular uses can be tested for ringdown baseline stability, the minimum detectable ringdown time difference over the averaged ringdown time, $\Delta\tau/\tau$. The response time includes the sensor's physical response time (load and unload), ringdown data processing and transmission time. In designing a sensor to meet a particular need, the reproducibility of the sensor responses to the same pressure at different testing times and responses to different pressures in a molded math function to be tested. A durability test for such sensor can be preformed non-stop, over a long monitor period in the presence of man-made harsh environments such as exposure to corrosive chemicals, humid variation, temperature variation, and vibration. By such testing of varied configurations and materials for the FRP sensor of the present invention, a wide variety of adaptations can be designed while remaining within the concept of the present invention.

Additional parameters of the various design configurations of which the present invention is capable can also be tested for effectiveness in a specific use environment.

For example, the pressure damage threshold can be tested using different sensor heads configured with: (1) the fiber only having the cladding and core, (2) the fiber with the polymer buffer, and (3) the fiber with the plastic jacket over the polymer buffer, for example. Adding metal plates on the sensor head can change the force applied to the sensor. Through the conversion, P=F/S, the response curve of ringdown time vs. force will be converted to ringdown time vs. pressure. Such pressure testing over a large range, from zero-tens of thousands psi can be performed for each unit as necessary depending on the internal use and expected environmental factors.

Specific design embodiments of the present invention can also be tested as development require for high and low temperature tolerance of the device. For such tests, the sensor head can be deployed into a liquid nitrogen sink for the low temperature tolerance testing. The sensor head can also be buried in a metal sink heated by a heating belt, heat gun (the max. temperature~870K) or heat oven (~1100 K), and low temperature atmospheric microwave plasma (>1800 K) for qualitative temperature tolerance testing under different temperature ranges. The temperature damage threshold can also be tested for embodiments of the invention which are adapted to particular use requirements.

When designing a specific embodiment of the FRP sensor of the present invention, pressure calibration curves can be developed as needed. Fiber ringdown pressure sensors of the present invention are based on sensing the microbending-induced radiative loss of the fiber by measuring the ringdown time when a pressure is applied to the sensor head. Different fiber materials or different geometries of pressure-fiber interaction areas will have different pressure responses. A base of calibration curves can be developed for several sensor units consisting of different configurations mentioned above. For pressure measurements in a small range, 0-1000 psi, a commercial FFPI pressure sensor can be used for one-on-one sensor comparison and for a modest level calibration. Pressure calibration in a large range, 0-150,000 psi, can be conducted at designated pressure calibration facilities. Such testing can be used to insure the design adaptation of the present invention is well-suited to the particular need.

All references cited with this application are herein fully incorporated by reference. Variations, modifications, and additions to this invention will be readily apparent to one skilled in the art and such modifications and additions would be fully within the scope of the invention, which is limited only by the following claims.

What is claimed is:

1. A sensing device comprising:
   a laser light source for producing a laser beam;
   a control component connected to said laser light source for controlling activation or deactivation of said laser light source;
   at least one section of optical fiber, configured to receive at least a portion of said laser beam and transmit at least a portion of said received laser beam within said optical fiber;
   at least one fiber coupler, wherein said at least one fiber coupler and said at least one section of optical fiber are spliced together to form a fiber loop;
   at least one sensor component, said sensor component configured to induce a loss in light from said optical fiber as a function of pressure exerted on the sensor component; and
   a photodetector, said photodetector configured to receive a signal originated from said sensor component and transmitted to said photodetector via said fiber coupler;
   wherein said signal provides data, wherein said data is analyzed and processed to determine a ringdown time in said fiber loop and wherein said determined ringdown time is used to determine a pressure being applied on the sensor component; and
   wherein said ringdown time ($\tau$) is related to the force applied by the following equation:

$$\tau = \tau_0\left(1 - \frac{\beta l}{\alpha L + E}F\right)$$

where $\tau_0$ is a ringdown time when no force is applied, F is the force applied, $\alpha$ is the wavelength dependent absorption coefficient for fiber core material of said optical fiber, $\beta$ is the force induced loss coefficient, l is the length of a fiber portion that has direct contact with the force being applied, L is the total length of said optical fiber, and E is total insertion losses of said fiber couplers.

2. The device of claim 1, further comprising a data acquisition system functionally connected to said photodetector for the acquisition of data sent from said photodetector.

3. The device of claim 2, wherein said data acquisition system analyzes and processes said data.

4. The device of claim 1, wherein said laser light source is a diode laser light source.

5. The device of claim 4, wherein said diode laser light source is selected from the group consisting of a temperature controlled diode laser, an external cavity diode laser, and a combination of multiple laser diodes used together to serve as a broad band tunable laser light source.

6. The device of claim 1, wherein said laser light source produces a laser beam having a wavelength from ultraviolet to near infrared in a range of 300 nm-10 μm.

7. The device of claim 1, wherein said laser light source produces a laser beam having a wavelength of about 1650 nm.

8. The device of claim 1, wherein said control component is an electrical control, said electrical control utilizing a pulsed wave generator.

9. The device of claim 1, wherein said control component is an electrical control, said electrical control utilizing a continuous wave generator.

10. The device of claim 1, wherein said control component is an electrical control, said electrical control utilizing an electrical board to achieve control.

11. The device of claim 1, wherein said at least one fiber coupler comprises a 2×1 fiber coupler.

12. The device of claim 1, wherein said device comprises multiple sensor heads, each of said multiple sensor heads being adapted to sense pressure, temperature or species in said same device.

13. The device of claim 1, wherein said device comprises a single fiber loop for measuring a single parameter.

14. The device of claim 1, wherein said device comprises multiple fiber loops for measuring multiple parameters in said device, said multiple parameters being more than one member selected from the group consisting of pressure, temperature, and species.

15. The device of claim 1, wherein said sensor component comprises a loading platform, said loading platform comprising a plate positioned on top of said sensor component.

16. The device of claim 1, wherein said sensor component is the location where force is applied when said device is sensing pressure.

17. The device of claim 1, wherein said sensing device senses pressure in the range of 0-150,000 psi.

18. The device of claim 1, wherein said pressure sensing is effective at temperatures ranging between 77-1900K.

19. The device of claim 1, wherein a fiber jacket encloses said section of optical fiber and said jacket is removed from said sensor head so as to increase sensitivity of said sensor head.

20. The device of claim 1, further comprising an optical component for increasing sensitivity of said device.

21. The device of claim 20, wherein said optical component is a fiber Bragg grating.

22. A method of sensing pressure, the method comprising:
(a) providing a pressure sensing device, said pressure sensing device comprising:
a laser light source for producing a laser beam;
a control component connected to said laser light source for controlling activation and deactivation of said laser light source;
at least one section of optical fiber oriented in a ringdown configuration and oriented to said light source so as to receive at least a portion of said laser beam and transmit at least a portion of said received laser beam within said optical fiber;
at least one fiber coupler;
at least one sensor component, said sensor component configured to induce a loss in light from said optical fiber as a function of pressure exerted on the sensor component;
a photodetector, said photodetector configured to receive a signal originated from said sensor component and transmitted to said photodetector via said fiber coupler; and
a data acquisition system functionally connected to said photodetector to receive data sent from said photodetector;
(b) activating said control component to control emission of light from said light source such that a portion of light emitted from said light source upon activation is transmitted through said at least one section of optical fiber, said control component acting to deactivate emission of light from said light source such that light initially emitted rings inside said at least one section of optical fiber for the course of said ringdown configuration, and at each round trip of said emitted light in said ringdown configuration, said emitted light loses a fraction of leaked light as it leaks from said at least one section of optical fiber and is transferred to said photodetector via said fiber coupler and a remnant of emitted light continuing to ring down in said optical fiber;
(c) determining a first ringdown time for said emitted light and a second ringdown time for a second emitted light that rings down when pressure is exerted on sensor component;
(d) determining a pressure exerted on said sensor component by comparing said first ringdown time and second ringdown time, wherein said second ringdown time ($\tau$) is related to a force applied by the following equation:

$$\tau = \tau_0\left(1 - \frac{\beta l}{\alpha L + E}F\right)$$

where $\tau_0$ is the first ringdown time when no force is applied, F is the force applied, $\alpha$ is the wavelength dependent absorption coefficient for fiber core material of said optical fiber, $\beta$ is the force induced loss coefficient, l is the length of a fiber portion that has direct contact with the force being applied, L is the total length of said optical fiber, and E is total insertion losses of said fiber couplers, and (e) outputting a result of step (d).

23. The method of claim 22, wherein said sensing device senses pressure in the range of 0-150,000 psi.

24. The method of claim 22, wherein said pressure sensing device is provided with a vacuum system for forming a low atmospheric pressure environment around said sensor component, whereby said sensor component can sense negative pressure.

25. The method of claim 22, wherein said pressure sensing is effective at temperatures ranging between 77-1900K.

26. The method of claim 22, wherein said activation and deactivation of said laser light source is at a frequency in the range of 1 Hz to 1 MHz.

27. The method of claim 26, wherein said frequency is about 10 Hz.

28. The method of claim 22, wherein said pressure sensing is not effected by electromagnetic interference.

* * * * *